United States Patent
Hines et al.

(10) Patent No.: US 11,568,167 B2
(45) Date of Patent: Jan. 31, 2023

(54) SYSTEMS AND METHODS FOR DETECTING DRIFT BETWEEN DATA USED TO TRAIN A MACHINE LEARNING MODEL AND DATA USED TO EXECUTE THE MACHINE LEARNING MODEL

(71) Applicant: Arthur AI, Inc., New York, NY (US)

(72) Inventors: Keegan E. Hines, Richmond, VA (US); John P. Dickerson, Washington, DC (US); Karthik Rao, Briarcliff Manor, NY (US); Rowan Cheung, New York, NY (US); Reese M. E. Hyde, Brooklyn, NY (US)

(73) Assignee: Arthur AI, Inc., New York, NY (US)

(*) Notice: Subject to any disclaimer, the term of this patent is extended or adjusted under 35 U.S.C. 154(b) by 0 days.

(21) Appl. No.: 17/824,164

(22) Filed: May 25, 2022

(65) Prior Publication Data
US 2022/0383038 A1 Dec. 1, 2022

Related U.S. Application Data

(60) Provisional application No. 63/193,375, filed on May 26, 2021.

(51) Int. Cl.
G06K 9/00 (2022.01)
G06K 9/62 (2022.01)
G06N 20/00 (2019.01)

(52) U.S. Cl.
CPC ........... *G06K 9/6215* (2013.01); *G06N 20/00* (2019.01)

(58) Field of Classification Search
None
See application file for complete search history.

(56) References Cited

U.S. PATENT DOCUMENTS

| | | |
|---|---|---|
| 11,227,192 B1 * | 1/2022 | Rahnama-Moghaddam ............... G06N 3/08 |
| 2020/0242505 A1 * | 7/2020 | Raz .................. G06F 16/285 |
| 2020/0379454 A1 | 12/2020 | Trinh et al. |
| 2021/0133632 A1 * | 5/2021 | Elprin ................. G06F 11/3409 |
| 2021/0334700 A1 * | 10/2021 | Nagaraja ............... G06N 20/00 |

OTHER PUBLICATIONS

International Search Report and Written Opinion for International Application No. PCT/US2022/030920, dated Oct. 31, 2022, 15 pages.

* cited by examiner

*Primary Examiner* — Soo Jin Park
(74) *Attorney, Agent, or Firm* — Cooley LLP

(57) ABSTRACT

In some embodiments, a first plurality of representations are extracted from a first data set. A first set of distributions are generated based on the first plurality of representations. A machine learning model is trained based on the first plurality of representations and the first set of distributions. A second plurality of representations are extracted from a second data set different from the first data set. The machine learning model is executed based on the second plurality of representations to produce a second set of distributions. An anomaly score is determined for each datum from the second data set to produce a set of anomaly scores. The set of anomaly scores are determined based on the first set of distributions and the second set of distributions. A notification is generated when at least one anomaly score from the set of anomaly scores is larger than a predetermined threshold.

21 Claims, 9 Drawing Sheets

SYSTEMS AND METHODS FOR DETECTING DRIFT BETWEEN DATA USED TO TRAIN A MACHINE LEARNING MODEL AND DATA USED TO EXECUTE THE MACHINE LEARNING MODEL

CROSS REFERENCE TO RELATED APPLICATIONS

This application claims priority to and the benefit of U.S. Provisional Patent Application No. 63/193,375, filed May 26, 2021 and titled "SYSTEMS AND METHODS FOR DETECTING DRIFT BETWEEN DATA USED TO TRAIN A MACHINE LEARNING MODEL AND DATA USED TO EXECUTE THE MACHINE LEARNING MODEL," the contents of which are incorporated by reference herein in their entirety.

TECHNICAL FIELD

The present disclosure relates to the field of data processing and particularly to systems and methods for detecting drift between a first data used to train a machine learning model and a second data used to execute the machine learning model.

BACKGROUND

Some known machine learning apparatus and methods can be useful in a wide range of applications including pattern recognition, image analysis, video analysis, computer vision, audio analysis, natural language processing, time series analysis, and/or the like. Some known apparatus and methods for machine learning, however, do not effectively address data drift challenges in training and executing machine learning models. Thus, a need exists for improved apparatus and methods for machine learning.

SUMMARY

In some embodiments, an apparatus includes a memory and a processor operatively coupled to the memory. The memory stores instructions to cause the processor to receive a first data set from a first remote compute device. The memory further stores instructions to cause the processor to extract a first plurality of representations from the first data set. The memory further stores instructions to cause the processor to generate a first set of distributions based on the first plurality of representations. The memory further stores instructions to cause the processor to train a machine learning model based on the first plurality of representations and the first set of distributions. The memory further stores instructions to cause the processor to receive a second data set from a second remote compute device. The second data set can be different from the first data set. The memory further stores instructions to cause the processor to extract a second plurality of representations from the second data set. The memory further stores instructions to cause the processor to execute the machine learning model based on the second plurality of representations, to produce a second set of distributions. The memory further stores instructions to cause the processor to determine a score for each datum from the second data set to produce a set of scores. The set of scores can be determined based on the first set of distributions and the second set of distributions. The memory further stores instructions to cause the processor to detect a data drift based on at least one score from the set of scores. The memory further stores instructions to cause the processor to cause transmission of a signal to cause at least one remedial action to be performed in response to detecting that the data drift exceeds a predefined threshold.

In some embodiments, a method includes extracting, via a processor, a first plurality of representations from a first data set. The method further includes generating a first set of distributions via the processor and based on the first plurality of representations. The method further includes training a machine learning model via the processor and based on the first plurality of representations and the first set of distributions. The method further includes extracting, via the processor, a second plurality of representations from a second data set different from the first data set. The method further includes executing the machine learning model via the processor and based on the second plurality of representations to produce a second set of distributions. The method further includes determining, via the processor, an anomaly score for each datum from the second data set to produce a set of anomaly scores. The set of anomaly scores can be determined based on the first set of distributions and the second set of distributions. The method further includes generating, via the processor, a notification when at least one anomaly score from the set of anomaly scores is larger than a predetermined threshold.

In some embodiments, a non-transitory processor-readable medium stores code representing instructions to be executed by at least one processor. The instructions include instructions to cause the at least one processor to extract a first plurality of representations from a first data set. The instructions further include instructions to cause the at least one processor to generate a first set of distributions based on the first plurality of representations. The instructions further include instructions to cause the at least one processor to train a machine learning model based on the first plurality of representations and the first set of distributions. The instructions further include instructions to cause the at least one processor to extract a second plurality of representations from a second data set different from the first data set. The instructions further include instructions to cause the at least one processor to execute the machine learning model based on the second plurality of representations to produce a second set of distributions. The instructions further include instructions to cause the at least one processor to determine a score for each datum in the second data set to produce a set of scores. The score for each datum in the second data set can be based on the first set of distributions and the second set of distributions, and indicate a similarity of that datum relative to the first data set. The instructions further include instructions to cause the at least one processor to detect a data drift based on at least one score from the set of scores. The instructions further include instructions to cause the at least one processor to cause at least one remedial action in response to detecting that the data drift exceeds a predefined threshold.

DETAILED DESCRIPTION

Non-limiting examples of various aspects and variations of the embodiments are described herein and illustrated in the accompanying drawings.

Some known machine learning methods and apparatus can be trained on training data (e.g., generated from a type of event, a type of data generating mechanism, a data generating device, and/or the like), fit that training data, and be generalizable to production data that is similar to the training data (e.g., is generated from the type of event, the type of data generating mechanism, the data generating device, and/or the like). In some instances, however, the production data can drift relative to the training data. This is called a data drift. The data drift can involve a gradual change over time (e.g., a change of ambient humidity data due to a change of seasons) or involve an abrupt change at a time (e.g., a change of financial performance data of a company due to a change in board of directors of that company). In such cases, sometimes the trained machine learning model based on the original training data can no longer represent the production data. Moreover, in some cases when the data include high-dimensional data and/or unstructured data, data drift detection can become challenging.

Apparatus and methods for data drift detection described herein can be used to detect the data drift (including a drift(s) in high dimensional and unstructured data), and train and execute a machine learning model(s) with an improve generalizability over the course of the data drift. To solve the abovementioned challenges, apparatus and methods for data drift detection described herein can:

(a) extract representations from training data and production data, (b) train a machine learning model that can estimate distributions of the extracted representations from the production data, and (c) detect an anomaly(ies) in distributions estimated from the representations of the production data compared to distributions of the representations of the training data.

Figure 1:
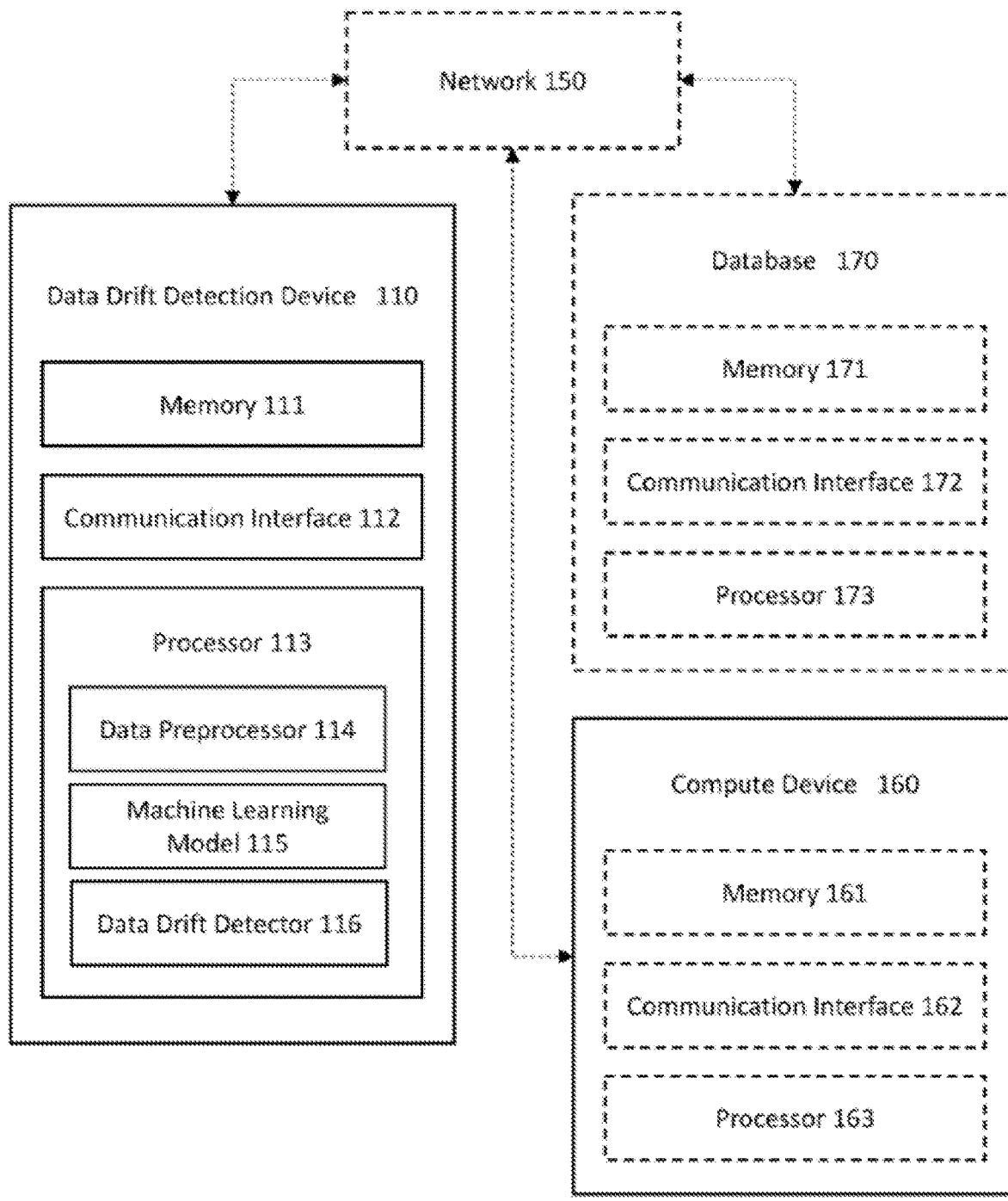
FIG. 1 is a block diagram of a data drift detection device, according to an embodiment.

FIG. 1 is a block diagram of a data drift detection device 110, according to an embodiment. The data drift detection device 110, includes a memory 111, a communication interface 112, and a processor 113 and can be used to store, analyze, and communicate data. The data drift detection device 110 can be optionally coupled to a compute device 160 and/or a database 170 via a network 150 (all shown in FIG. 1 in dashed boxes to indicate they are optional), to receive, transmit, and/or process data.

The data used by the data drift detection device 110 can include, for example, unstructured data (e.g., sensor data in Internet of Things (IoT) application(s), media and entertainment content, business documents (e.g., invoices, records, etc.), publications and listings, and/or the like), semi-structured data (e.g., emails, Hyper Text Markup Language (HTML) files, not only structured query language (NoSQL) databases, and/or the like), and/or structured data (e.g., tabular data, columnar data, and/or the like). The data can include, for example, imagery data, video data, audio data, text data, natural language data, time series data, tabular data, and/or the like. In some instances, for example, the data can include surveillance camera data, email data, diet data, preference data, fitness data, medical record data, financial data, mobile location data, demographic data, behavioral data, transaction data, loyalty data, and/or the like.

The memory 111 of the data drift detection device 110 can be, for example, a random access memory (RAM), a read-only memory (ROM), a flash drive, a secure digital (SD) memory card, an embedded multi-media card (eMMC), and/or the like. The memory 111 can store data such as, for example, imagery data, video data, audio data, text data, natural language data, time series data, tabular data, and/or the like. The memory 111 can further store code that includes instructions to cause the processor 113 to execute one or more processes or functions (e.g., a data preprocessor 114, a machine learning model 115, and a data drift detector 116).

The communication interface 112 of the data drift detection device 110 can be a hardware component of the data drift detection device 110 to facilitate data communication between the data drift detection device 110 and external devices (e.g., the compute device 160 and/or the database 170, via network 150) or internal components of the data drift detection device 110 (e.g., the memory 111, the processor 113). The communication interface 112 is operatively coupled to and used by the processor 113 and/or the memory 111. The communication interface 112 can be, for example, a network interface card (NIC), a Wi-Fi® module, a Bluetooth® module, an optical communication module, and/or any other suitable wired and/or wireless communication interface, or combination thereof. The communication interface 112 can be configured to connect the data drift detection device 110 to the network 150 and can facilitate receiving and/or transmitting data (e.g., imagery data, video data, audio data, text data, natural language data, time series data, tabular data, and/or the like) and/or models (e.g., the machine learning model 115), via the network 150, from/to the compute device 160 and/or the database 170. In some implementations, the database 170 and/or compute device 160 are remote from the data drift detection device 110. Said another way, the database 170 and/or compute device 160 can be physically separate from (e.g., geographically distanced from) the data drift detection device 110, and communicate with the data drift detection device 110 wirelessly.

The processor 113 can be, for example, a hardware-based integrated circuit (IC) or any other suitable processing device configured to run or execute a set of instructions or a set of codes. For example, the processor 113 can include a general-purpose processor, a central processing unit (CPU), a field programmable gate array (FPGA), a graphics processing unit (GPU), a neural network processor (NNP), and/or the like. The processor 113 can be operatively coupled to the memory 111 and/or communication interface 112 through a system bus (e.g., address bus, data bus, and/or control bus; not shown). The processor 113 includes a data preprocessor 114, a machine learning model 115, and a data drift detector 116. In some implementations, each of the data preprocessor 114, the machine learning model 115, and the data drift detector 116 can include a set of instructions performed by the processor 113 to carry out functions for the data preprocessor 114, the machine learning model 115, and the data drift detector 116. In some implementations, each of the data preprocessor 114, the machine learning model 115, and the data drift detector 116, can include one or more integrated circuits (ICs) in the processor 113 that perform the set of instructions.

The data preprocessor 114 can receive training data (e.g., unstructured data, semi-structured data, unstructured data, multidimensional data, etc.) and select reference data (also known as the "first set of data") from the training data, to train the machine learning model 115 during a training phase. Each item in the reference data can be considered as a singular input to the machine learning model 115 during the training phase. In some instances, the reference data can include the entire training data or a sufficient subset of data (sufficient to train the machine learning model 115 with a desired accuracy) from the training data. The reference data can be selected from the training data to include a heterogeneous population of data. For example, in some instances, the training data can include 10 terabytes (TB) of unstructured data and the data preprocessor 114 can select 100 megabytes MB of reference data from the 10 TB of unstructured data for training, testing, and tuning the machine learning model 115.

The data preprocessor 114 can further perform representation extraction by receiving the reference data as input and extracting/generating representations (also referred to as the "embeddings") as output. In some implementations, a representation can refer to a lower-dimensional, learned continuous vector representation of discrete variables into which higher-dimensional vectors can be translated. In some instances, the use of representations can improve the machine learning model's efficiency and usability. In some instances, for example, the data preprocessor 114 can use an autoencoder, a convolutional neural network, a bag-of-word encoder, a continuous vector embedding model (e.g., Word2Vec, GloVe, etc.), or any other suitable models for generating the representations. In some instances, the representations can be fixed-size numeric representations from the training data. Because some machine learning models can only take lower-dimensional data as inputs (e.g., some neural networks require the input features to be numeric), one potential advantage of extracting/generating representations is that a machine learning model that may not otherwise have been implementable is now implementable. Another potential advantage of extracting/generating representations is that representations can be learned and reused across multiple machine learning models. Another potential advantage of extracting/generating representations is that the data used for training a machine learning model and/or providing as input to the machine learning model is relatively simpler, which can improve performance of the machine learning model (and device(s) using the machine learning model).

The machine learning model 115 (also referred to as the "density estimator") includes a set of model parameters (e.g., nodes, weights, biases, etc.) and can receive the representations generated by the data preprocessor 114, perform mathematical operations (e.g., arithmetic operations, logical operations, and/or the like) on the representations using the set of model parameters to produce at least one distribution of the representations. For example, in some instances, the representations can be numerical values generated based on pixel values of convolutional filters (e.g., by maximum pooling each filter from the convolutional filters) that represent a facial image. The machine learning model 115 can generate the at least one distribution based on the pixel values of the convolutional filters. The machine learning model 115 can generally operate during a training phase (during which a set of known representations associated with a set of known distributions are used to train the set of model parameters of the machine learning model 115; described below) and a production phase (during which the set of model parameters of the machine learning model 115 receive a set of unknown representations to generate a set of unknown distributions; described below). The machine learning model 115 can include at least one of a residual network model, a variational autoencoder model, a normalizing flow model, or a generative adversarial network model, and/or the like. In some implementations, the machine learning model 115 is configured to receive representations as input, but receiving higher-dimensional data as input can cause the machine learning model 115 to be inoperative, perform sub-optimally, and/or perform worse compared to if lower-dimensional data was used. In some implementations, a distribution can refer to a representation of one or more statistical properties (e.g., frequency, mean, median, size, etc.) associated with (e.g., describing) representations. In some implementations, a distribution can be a histogram. In some implementations, a distribution can be a multi-dimensional histogram.

During the training phase, the machine learning model 115 receives a first set of representations and a first set of distributions of the representations at multiple iterations. At each iteration from the multiple iteration, the machine learning model 115 generates an estimated distribution based a subset of representation (also referred to as "batch of representations") from the first set of representations. The estimated distribution can be compared to a truth value (a distribution from the first set of distributions) to generate a loss value. An objective function and/or an optimization algorithm can be then used to adjust the set of model parameters (e.g., nodes, weights, biases, etc.) of the machine learning model 115 to minimize the loss value. Once predetermined threshold for the loss value has been reached, the machine learning model 115 is deemed to be trained (referred to as the "trained machine learning model") and can be deployed to production (referred to as the "deployed machine learning model"). For example, the trained machine learning model can be packaged in a lightweight file (e.g., 1 megabytes, 2 megabytes, 10 megabytes, 20 megabytes, 100 megabytes, 200 megabytes, etc.) that can be executed by the data drift detection device 110, the compute device 160, and/or the server 170. During the production phase, the deployed machine learning model receives a second set of representations different than the first set of representations. The deployed machine learning model can generate at least one predicted distribution from the second set of representations.

The second set of representations is originated from new reference data (also known as the "second set of data") other than the reference data from which the first set of representation are extracted and is therefore different from the first set of representations. In some instances, although the second set of representations is not the same as the first set of representations, statistical properties (e.g., distribution, mean, variance, etc.) of the second set of representation is similar to (e.g., is within 1% of, within 2% of, within 5% of, within 10% of, within 25% of, within 50% of, etc.) statistical properties of the first set of representations. In such instances, it could be said no data drift exists (or there is insignificant data drift) between the second set of representations and the first set of representations. Thus, the deployed machine learning model can accurately generate the at least one predicted distribution from the second set of representations (that is a difference between the at least one predicted distribution and at least one true distribution of the second set of representations is less than a predetermined acceptable value). In contrast, in some instances, the second set of representations is not the same as the first set of representations, and the statistical properties of the second set of representation are not similar to (e.g., are not within 1% of, not within 2% of, not within 5% of, not within 10% of, not within 25% of, not within 50% of, etc.) statistical properties of the first set of representations. In such instances, it could be said that data drift (also known as the "concept drift") exists between the second set of representations and the first set of representations (or that there is significant data drift). Thus, the deployed machine learning model cannot accurately generate the at least one predicted distribution from the second set of representations (that is a difference between the at least one predicted distribution and the at least one true distribution of the second set of representations is more than the predetermined acceptable value). Such data drift can be, for example, due to a gradual change in data-generating factors (e.g., a seasonal change in temperature) overtime or a sudden change in data-generating factors (e.g., a sudden impact of a pandemic on financial performance of a company).

The data drift detector 116 can invoke the deployed machine learning model (or, in some instances, the trained machine learning model) to generate the at least one predicted distribution from the second set of representations and generate a score for each datum in the second set of data. The score can quantify, for example, a level of similarity of that datum from the second set of data, to the first set of data. The data drift detector 116 can be implemented such that each datum received during the production phase is assessed individually and immediately upon reception. In some implementations, the data drift detector 116 can collect a first subset of data from the second set of reference data during a predetermined time interval (e.g., 1 second, 2 seconds, 1 minute, 2 minutes, 1 hour, 2 hours, 1 day, 2 days, 1 week, 2 weeks, etc.). In some implementations, the data drift detector 116 can randomly sample a second subset of data from the second set of reference at random times.

The database 170 can be/include one or more compute devices particularly suitable for data storage and can be configured to receive, store, and/or transmit, for example, the first set of reference data and/or the second set of reference data described above. The database 170 can include, for example, a network of electronic memories, a network of magnetic memories, a server(s), a blade server(s), a storage area network(s), a network attached storage(s), deep learning computing servers, deep learning storage servers, and/or the like. The database 170 can include a memory 171, a communication interface 172 and/or a processor 173 that are structurally and/or functionally similar to the memory 111, the communication interface 112, and/or the processor 113 as shown and described with respect to the data drift detection device 110. The memory 171 can store data, the processor 173 can analyze the data (e.g., clean, normalize, process, and/or organize the data), and the communication interface 172 can receive/transmit the data from/to the data drift detection device 110 and/or the compute device 160 via the network 150.

The compute device 160 can be, for example, a user device that deploys a trained machine learning model (e.g., packages the trained machine learning model received from the data drift detection device 110 in a lightweight file (e.g., a 1 megabytes file, a 2 megabytes file, a 10 megabytes file, a 20 megabytes file, a 100 megabytes file, a 200 megabytes file, etc.) and executes the lightweight file based on application-specific data received by the compute device 160).

The compute device 160 can include, for example, a laptop computer, a desktop computer, a mobile phone, and/or the like, of a user (e.g., an administrator of a business, an operator of a machine, a customer of a store, and/or the like). In some instances, the compute device 160 can receive and deploy the trained machine learning model from the data drift detection device 110 and execute the deployed machine learning model on user-specific data. The compute device 160 includes a memory 161, a communication interface 162, and a processor 163. The memory 161, the communication interface 162, and the processor 163 can be structurally and/or functionally similar to the memory 111, the communication interface 112, and/or the processor 113 as shown and described with respect to the data drift detection device 110. The compute device 160 can be operatively coupled (e.g., via the network 150) to the data drift detection device 110 to receive the trained machine learning model and/or to the database 170 to receive data for executing the trained machine learning model.

The data drift detection device 110 can assess and monitor data drift between first set of data (e.g., training data received at the data drift detection device 110 from the database 170 and/or the compute device 160) used to train the machine learning model 150 (during a training phase) and second set of data (e.g., production data received at the data drift detection device 110 from the database 170 and/or the compute device 160) processed by the machine learning model after training and/or deployment (during a production phase). The data drift detector 116 can generate at least one score that indicates a measure of similarity of the second set of data (or a subset of the second set of data) to the first set of data. Once the data drift detection device 110 detects data drift in the second set of data based on the at least one score (e.g., detecting a gradual data drift or a sudden but persistent data drift, based on a trend of a set of scores collected over a period of time) the data drift detection device 110 can perform an automated remedial action. In some implementations, the remedial action can include generating a notification to notify a user of the data drift detection device 110, the database 170, and/or the computer device 160 about the data drift.

In some implementations, upon and in response to a detection of the data drift in the second set of data (or upon and in response to detecting data draft in the second set of data significant enough to warrant a remedial action/exceeding a predetermined threshold amount of data drift), the data drift detection device 110 can send (or cause to be sent) a message to the user of the data drift detection device 110, the database 170, and/or the compute device 160 about the data drift as a remedial action, and can include the at least one score, the trend of the set of scores collected over a period of time, and/or a recommendation to help the user make a decision on how to handle (or respond to or compensate for) the data drift. For example, the data drift detection device 110 can analyze imagery data collected by a surveillance camera installed on a pole next to a road and can detect a sudden change (e.g., caused by rain or a water splash on a rainy day) to the reference data collected by the surveillance camera. The data drift detection device 110 can send a set of images to the user including images before the sudden change and after the sudden change and send a recommendation to the user to clean the camera, coat a lens of the camera, adjust the camera, and/or the like.

In some implementations, upon and in response to a detection of the data drift in the second set of data (or upon and in response to detecting data draft in the second set of data significant enough to warrant a remedial action/exceeding a predetermined threshold amount of data drift), the data drift detection device 110 can retrain the machine learning model based on at least the second set of data and/or adjust an analytical model based on the second set of data as a remedial action. Retraining the machine learning model can adjust the set of model parameters of the machine learning model 115 to compensate for the data drift. For example, the data drift detection device 110 can collect and analyze a temperature sensor fusion data of a greenhouse collected by a set of thermal sensors installed on various locations of the greenhouse. The data drift detection device 110 can additionally include an analytical model to calculate a pressure of a greenhouse water pump. The data drift detection device 110 can detect a gradual increase in temperature over years (e.g., due to the global warming). In response, the data drift detection device 110 can use the temperature sensor fusion data to retrain the machine learning model and/or adjust the analytical model (e.g., by adding a constant value or increasing a linear factor of the analytical model) to correct the pressure of the greenhouse water pump for the data drift.

Figure 3:
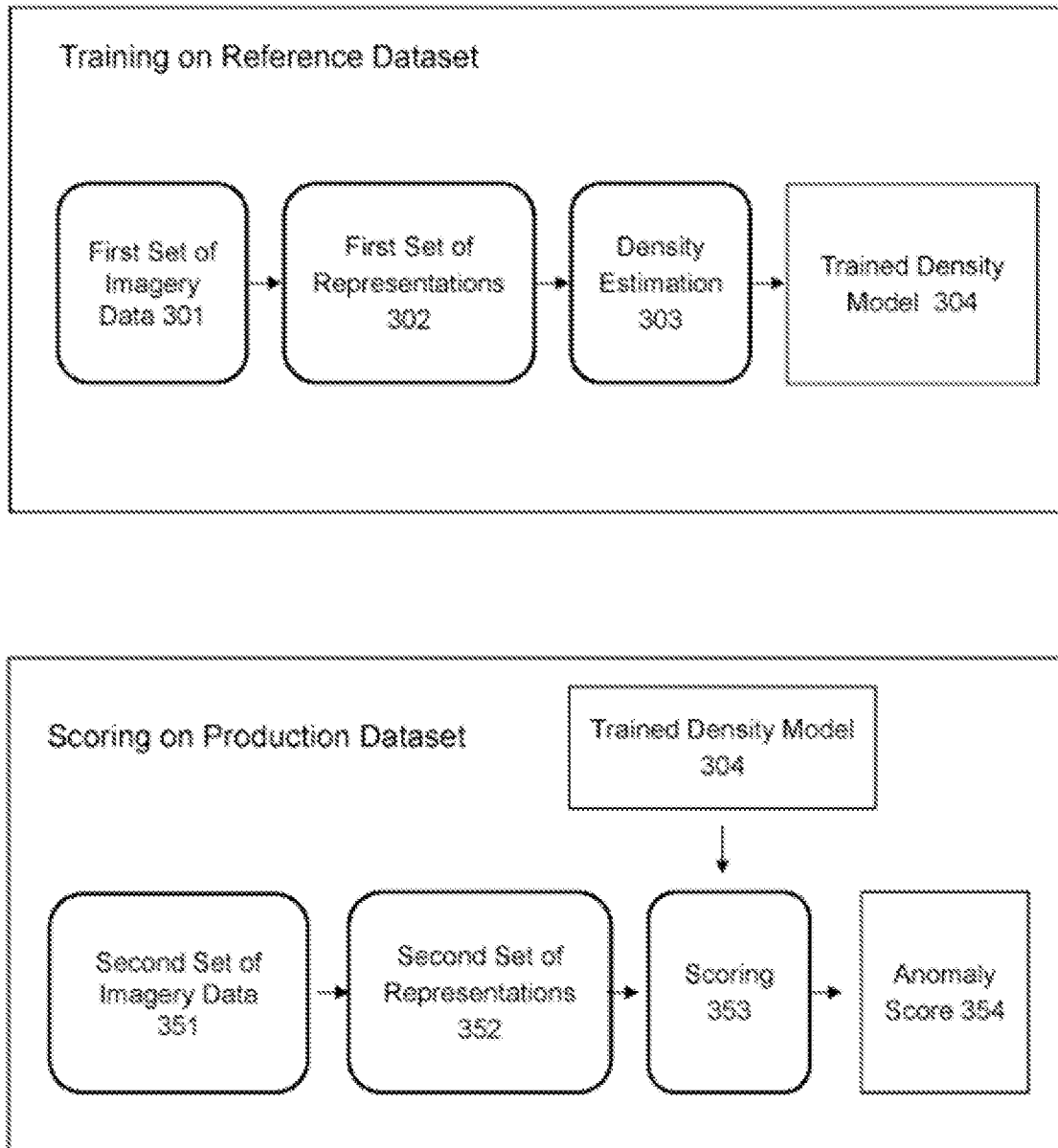
FIG. 3 is a schematic illustration of a method of detecting data drift in imagery data, according to an embodiment.

In some instances, as shown in FIG. 3, the data drift detection device 110 can be configured to train and deploy a computer vision machine learning model for analyzing imagery data. The data drift detection device 110 can further detect data drift in the imagery data input to the computer vision machine learning model. A first set of imagery data 301 (e.g., including grayscale images and/or multicolor images) can be received to train the computer vision machine learning model. A pre-trained convolutional neural network can be used to extract a low dimensional representation (e.g., 200 dimensions) of each image from the imagery data and generate the first set of representations 302. For example, the pretrained convolutional neural network can be/include a residual network (ResNet) model, a visual geometry group (VGG) model, and/or the like. After generating the first set of representations, the computer vision machine learning model (e.g., a variational autoencoder, a generative model, a distribution learning model, a normalizing flow model, a generative adversarial network model, and/or the like) can be trained based on the first set of representations. The trained computer vision machine learning model (also referred to as the "trained density model") 304 includes a density model 303 and/or a likelihood model that can estimate or quantify a distribution of the first set of imagery data 301 as represented in the first set of representations. The data drift detection device 110 can send a second set of representations 352 of a second set of imagery data 351 to the trained computer vision machine learning model 304 and then use an output of the trained computer vision machine learning model to calculate, at 353, a score (also referred to as the "anomaly score") 354 indicating a data drift of the second set of representations 352 compared to the first set of representations 302. The score can be a real-valued number (e.g., a likelihood, a reconstruction error, a proxy value based on the likelihood and/or the reconstruction error) that is associated with (specific to) each image in the second set of imagery data 351.

Figure 4:
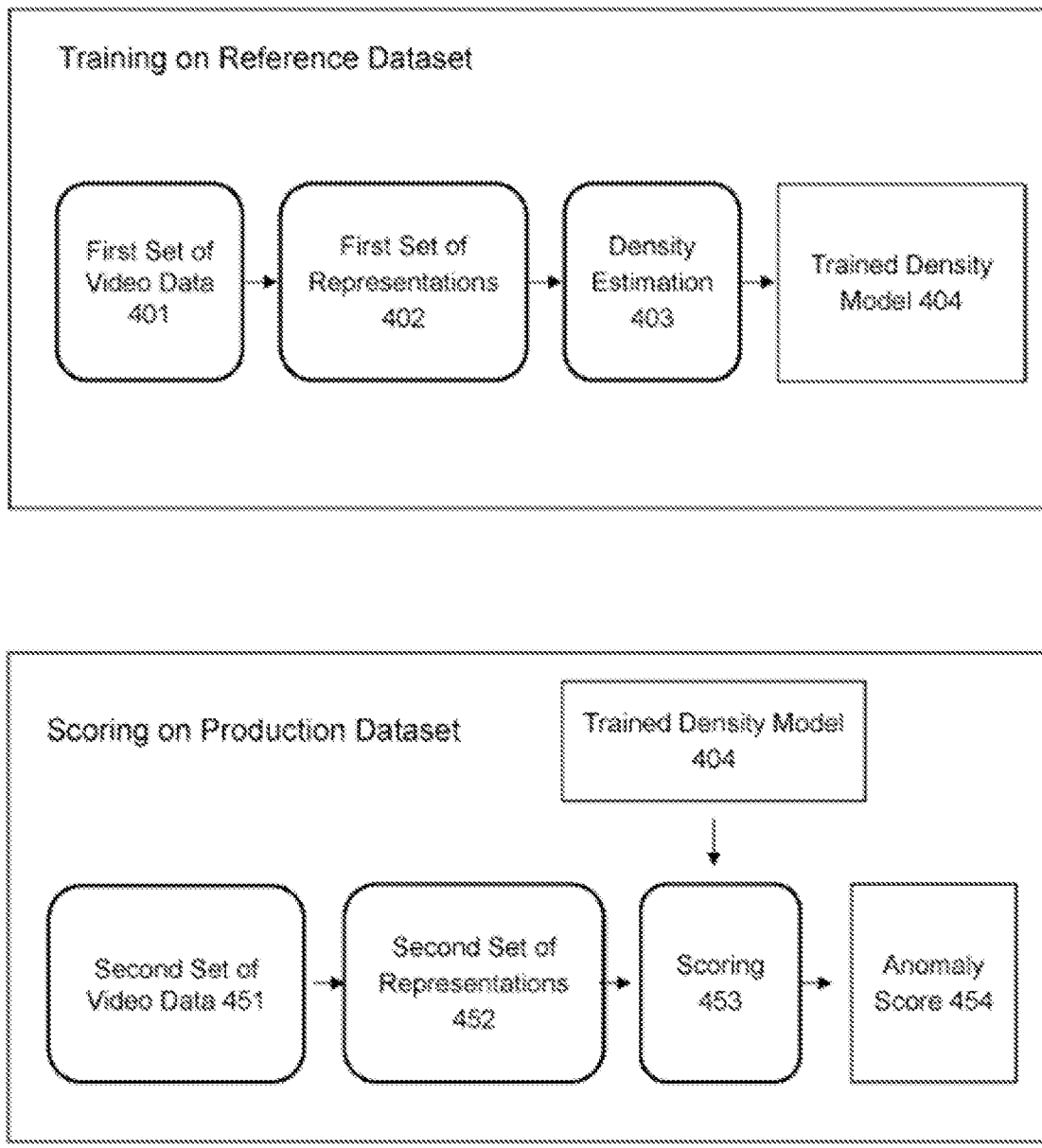
FIG. 4 is a schematic illustration of a method of detecting data drift in video data, according to an embodiment.

In some instances, as shown in FIG. 4, the data drift detection device 110 can be configured to train and deploy a computer vision machine learning model for analyzing video data. The data drift detection device 110 can further detect data drift in the video data (e.g., multicolor video frame sequences) input to the computer vision machine learning model. A first set of video data 401 can be received to train the computer vision machine learning model. An unsupervised representation learning model can be used to compute fixed-length numeric representations of first set of video data and generate the first set of representations 402. After generating the first set of representations, the computer vision machine learning model (e.g., a variational autoencoder, a generative model, a distribution learning model, a normalizing flow model, a generative adversarial network model, and/or the like) can be trained based on the first set of representations. The trained computer vision machine learning model (also referred to as the "trained density model") 404 can include, for example, a density model 403 and/or a likelihood model that can estimate or quantify a distribution of the first set of video data as represented in the first set of representations. The data drift detection device 110 can send a second set of representations 452 of a second set of video data 451 to the trained computer vision machine learning model and then use an output of the trained computer vision machine learning model to calculate, at 453, a score 454 indicating a data drift of the second set of representations 452 (based on the first set of video data) compared to the first set of representations (based on the second set video data). The score can be a real-valued number (e.g., a likelihood, a reconstruction error, a proxy value based on the likelihood and/or the reconstruction error) that is associated with (specific to) each frame in the second set of video data 451.

Figure 5:
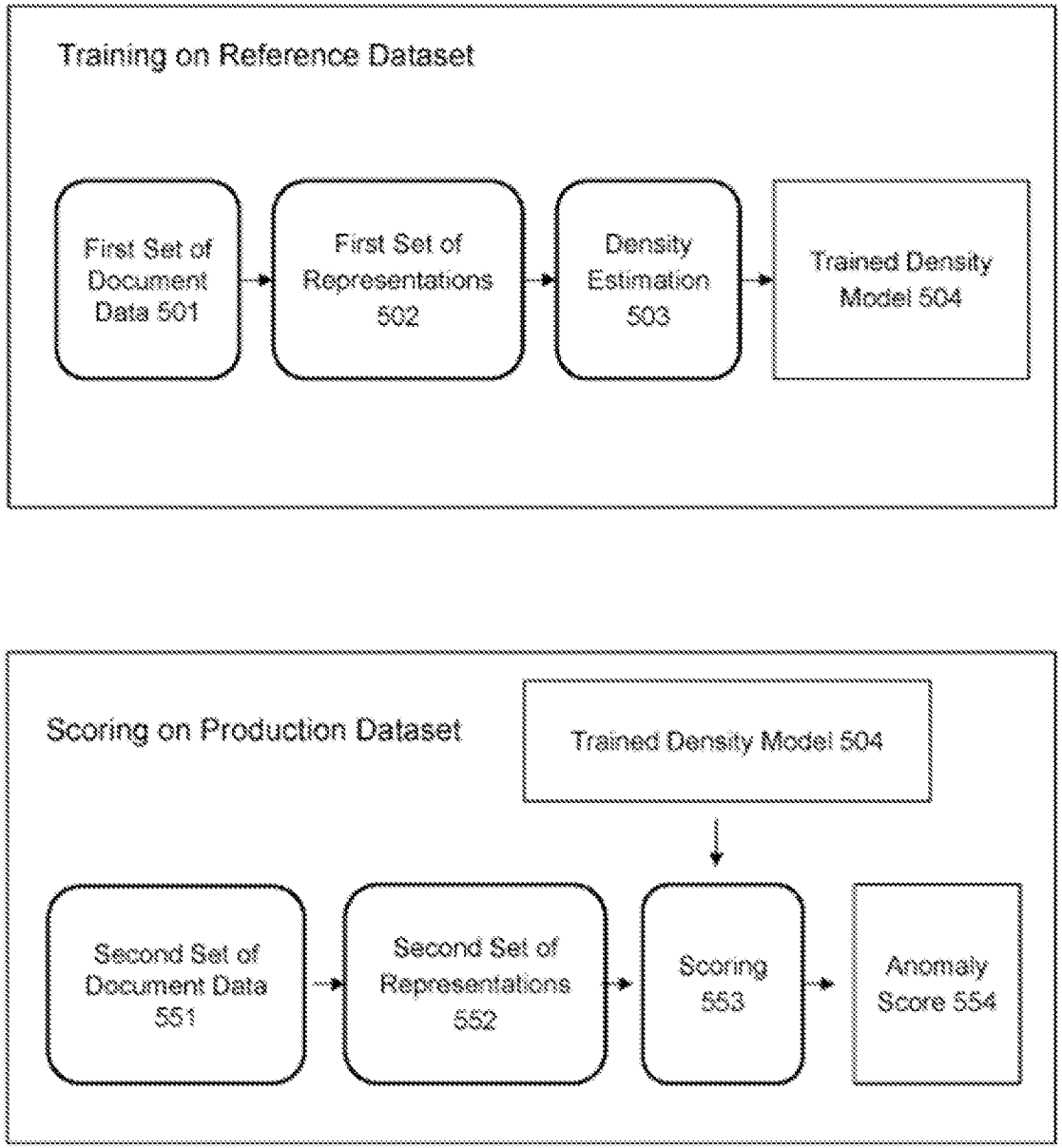
FIG. 5 is a schematic illustration of a method of detecting data drift in document data, according to an embodiment.

In some instances, as shown in FIG. 5, the data drift detection device 110 can be configured to train and deploy a natural language processing machine learning model for analyzing sequential data. The data drift detection device 110 can further detect data drift in the sequential data input to the natural language processing machine learning model. A first set of unstructured text data can be received to train the natural language processing machine learning model. A pre-trained neural network can be used to extract a low dimensional representation of text portions (e.g., words, phrases, and/or the like) from the unstructured text data and generate the first set of representations 502. For example, the pretrained neural network can be/include a transformer network model, a bidirectional encoder representation from transformers (BERT) network model, a robustly optimized BERT pretraining approach (RoBERTa) network model, and/or the like. After generating the first set of representations, the natural language processing machine learning model (e.g., a variational autoencoder, a generative model, a distribution learning model, a normalizing flow model, a generative adversarial network model, and/or the like) can be trained based on the first set of representations. The trained natural language processing machine learning model (also referred to as the "trained density model") 504 can include, for example, a density model 503 and/or a likelihood model that can estimate or quantify a distribution of the first set of unstructured text data as represented in the first set of representations. The data drift detection device 110 can send a second set of representations 552 of a second set of unstructured text data 551 to the trained natural language processing machine learning model 504 and then use an output of the trained natural language processing machine learning model 504 to calculate, at 553, a score 554 indicating a data drift of the second set of representations 552 (based on the first set of unstructured text data) compared to the first set of representations 502 (based on the second set of unstructured text data). The score can be a real-valued number (e.g., a likelihood, a reconstruction error, a proxy value based on the likelihood and/or the reconstruction error) that is associated with (specific to) each text in the second set of unstructured text data 551.

Figure 6:
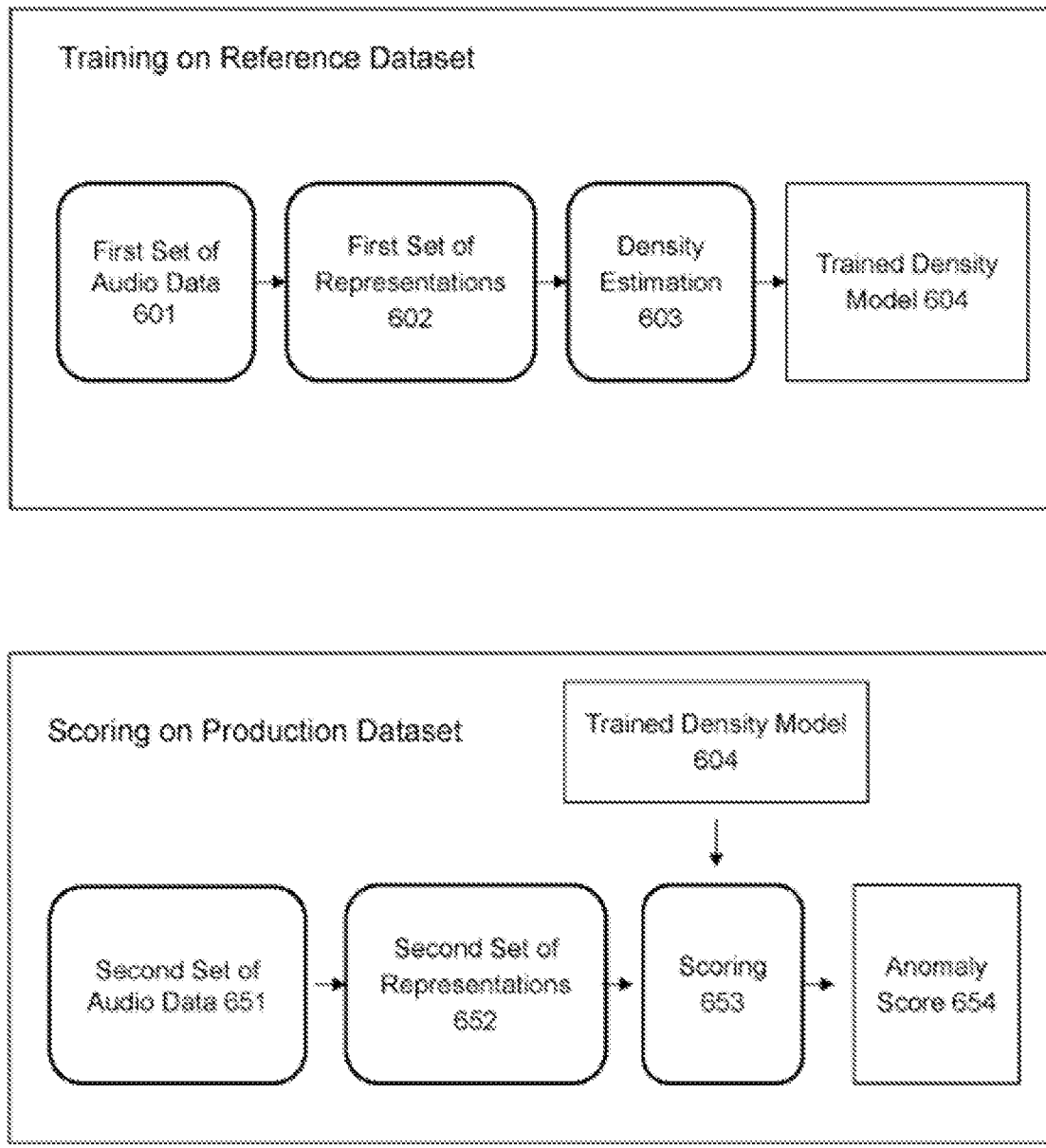
FIG. 6 is a schematic illustration of a method of detecting data drift in audio data, according to an embodiment.

In some instances, as shown in FIG. 6, the data drift detection device 110 can be configured to train and deploy an audio analysis machine learning model for analyzing audio data (e.g., a set of audio signals representing acoustic vibrations). The data drift detection device 110 can further detect data drift in the audio data input to the audio analysis machine learning model. A first set of audio data can be received to train the audio analysis machine learning model. An unsupervised representation learning model can be used to compute fixed-length numeric representations of first set of audio data and generate the first set of representations 602. After generating the first set of representations, the audio analysis machine learning model (e.g., a variational autoencoder, a generative model, a distribution learning model, a normalizing flow model, a generative adversarial network model, and/or the like) can be trained based on the first set of representations. The trained audio analysis machine learning model (also referred to as the "trained density model") 604 can include, for example, a density model 603 and/or a likelihood model that can estimate or quantify a distribution of the first set of audio data as represented in the first set of representations. The data drift detection device 110 can send a second set of representations 652 of a second set of audio data 651 to the trained audio analysis machine learning model 604 and then use an output of the trained audio analysis machine learning model 604 to calculate, at 653, a score 654 indicating a data drift of the second set of representations 652 (based on the first set of audio data) compared to the first set of representations 602 (based on the second set audio data). The score can be a real-valued number (e.g., a likelihood, a reconstruction error, a proxy value based on the likelihood and/or the reconstruction error) that is associated with (specific to) each signal in the second set of audio data 651.

In some instances, the data drift detection device 110 can be configured to train and deploy a structured data machine learning model for analyzing structured data (e.g., tabular data). The data drift detection device 110 can further detect data drift in the tabular data input to the structured data machine learning model. A first set of tabular data can be received to train the structured data analysis machine learning model. A dimensionality reduction procedure such as, for example, a principal components analysis or an independent components analysis can be used to compute representations of the first set of tabular data and generate the first set of representations. After generating the first set of representations, the structured data analysis machine learning model (e.g., a variational autoencoder, an isolation forest model, and/or the like) can be trained based on the first set of representations. The trained structured data analysis machine learning model includes a density model and/or a likelihood model that can estimate or quantify a distribution of the first set of tabular data as represented in the first set of representations. The data drift detection device 110 can send a second set of representations of a second set of tabular data to the trained structured data analysis machine learning model and then use an output of the trained structured data analysis machine learning model to calculate a score indicating a data drift of the second set of representations (based on the first set of tabular data) compared to the first set of representations (based on the second set tabular data). The score can be a real-valued number (e.g., a likelihood, a reconstruction error, a proxy value based on the likelihood and/or the reconstruction error) that is associated with (specific to) each input data in the second set of tabular data.

Figure 2:
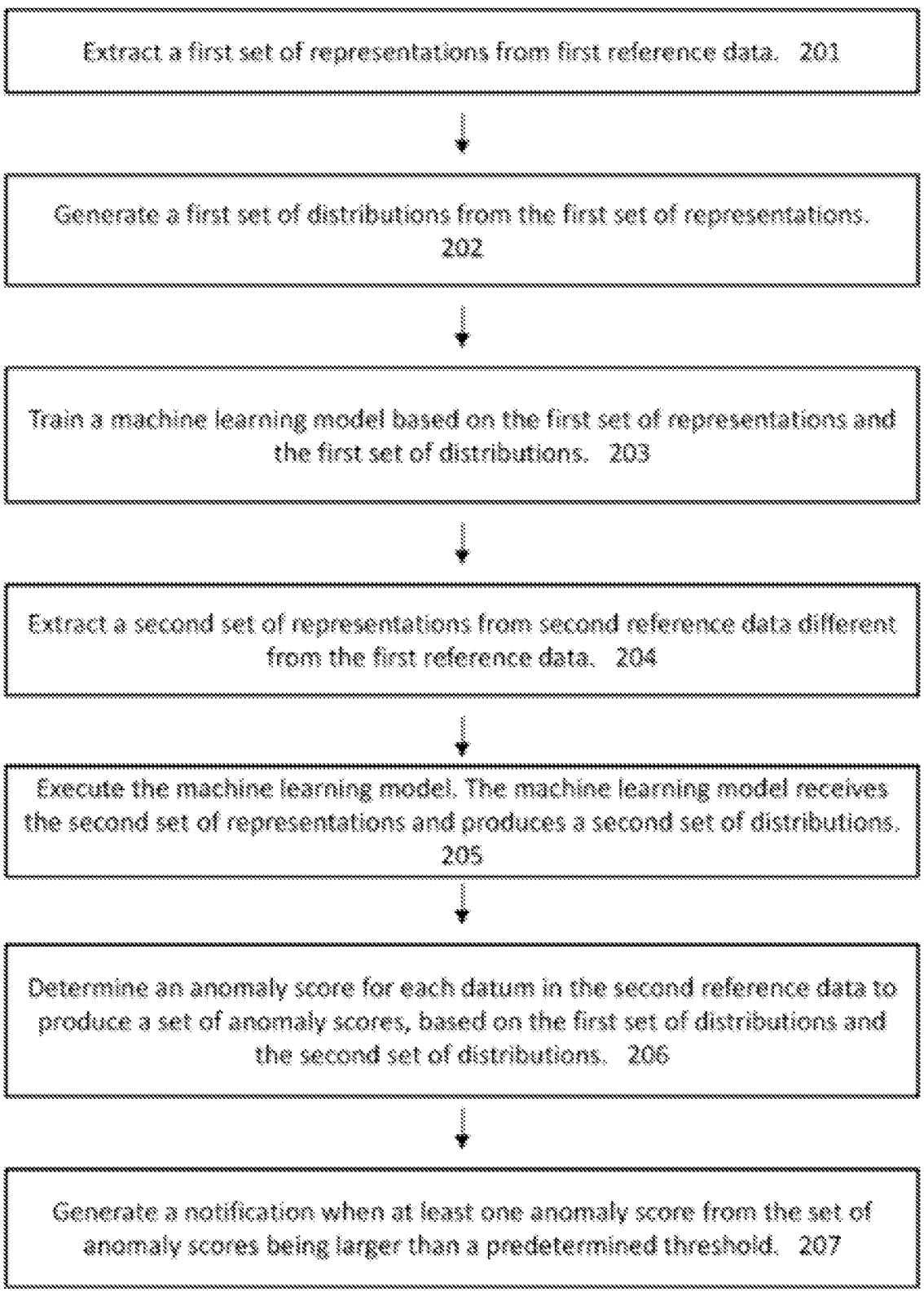
FIG. 2 is a flowchart showing a data drift detection method, according to an embodiment.

FIG. 2 is a flowchart showing a data drift detection method 200, according to an embodiment. In some embodiments, the data drift detection method 200 can be performed by a data drift detection device (e.g., the data drift detection device 110 as shown and described with respect to FIG. 1). At 201, a first set of representations (e.g., fixed-length representations, numerical representations, textual representations, and/or the like) are extracted (e.g., using the data preprocessor 114 shown and described with respect to FIG. 1) from a reference data. The reference data can include unstructured and/or multidimensional data and can be stored in a memory (e.g., memory 111) and/or be received from a compute device (e.g., the compute device 160) and/or a database (e.g., the database 170). In some instances, the representations can be structured information that are extracted from the unstructured and/or multidimensional data in the form of entities, events, relationship between entities and/or events, dates, names, and/or the like. Extracting the first set of representations can be performed by, for example, a dimensionality reduction method(s), an autoencoder(s), a component analysis method(s), optical character recognition (OCR), and/or the like. At 202, a first set of distributions are generated from the first set of representations. In some instances, for example, the data drift detection device can determine frequency values of each representation among the first set of representations and thereafter generate a first set of distribution (e.g., a set of histograms of the first of representations, in an order of ascending frequencies, in an order of descending frequencies, matched to a predetermined function (e.g., a Gaussian function), and/or the like).

At 203, a machine learning model (including a set of model parameters (e.g., nodes, weights, etc.)) is trained based on the first set of representations and the first set of distributions. In some instances, the machine learning model can include, for example, a residual network model, a variational autoencoder model, a normalizing flow model, or a generative adversarial network model, and/or the like. During a training phase, the machine learning model can iteratively receive a subset of the first set of representations and a subset of the first set of distributions to optimize the set of model parameters towards reducing a loss value based on predicted distributions (generated from the subset of the first set of representations) and the subset of the first set of distributions. After the machine learning model is trained (and is deployed to production), at 204, a second set of representations is extracted from second set of data different from the first set of data.

At 205, the machine learning model is executed (e.g., invoked by the data drift detection device to detect drift in the second set of representations and/or the second set of data). When executed, the machine learning model receives the second set of representations (e.g., divided to batches of data and received by the machine learning model sequentially, in parallel, and/or a combination of the two) and generates/produces a second set of distributions. Generally, in the production phase of 205, unlike the training phase of 202, frequencies of the second set of distributions are not determined and histograms are not generated. Instead, the machine learning model (the deployed machine learning model in production) generates the distributions based on the set of model parameters (e.g., weights and biases) that were trained (optimized towards reducing the loss value) during the training phase.

At 206, an anomaly score for each datum in the second set of data can be determined (e.g., by the data drift detector of FIG. 1) to produce a set of anomaly scores, based on the first set of distributions and the second set of distributions. In some instances, the set of anomaly scores can be determined in substantially real-time (e.g., 100 milliseconds, 200 milliseconds, 1 second, 2 seconds, 10 seconds, 20 seconds, and/or the like). In some instances, the set of anomaly scores can be determined periodically and at predetermined times. At 207, when at least one anomaly score from the set of anomaly scores is larger than a predetermined threshold, a notification is generated. The notification can be sent to a user (e.g., a user of the data drift detection device 110, the compute device 160, and/or the database 170 shown and described with respect to FIG. 1). In some instances, the data drift detection device 110 can retrain the machine learning model based on the set of anomaly scores and the second set of representations.

Figure 7:
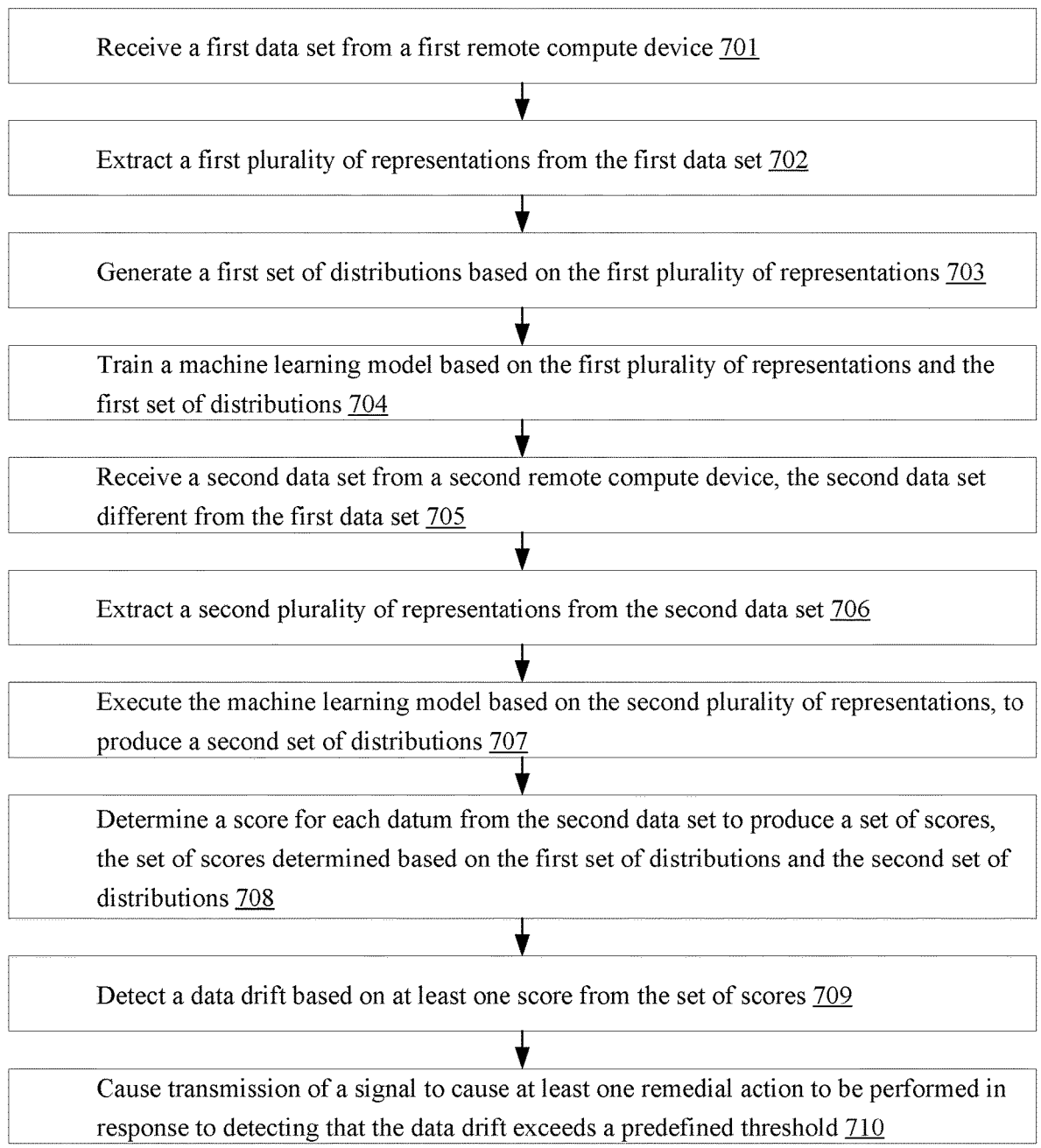
FIG. 7 shows a flowchart of a first method for detecting data drift, according to an embodiment.

FIG. 7 shows a flowchart of a method 700 for detecting data drift, according to an embodiment. In some implementations, method 700 can be performed by processor 113 of the data drift detection device 110.

At 701, a first data set is received from a first remote compute device (e.g., database 170 or compute device 160). At 702, a first plurality of representations are extracted (e.g., using data preprocessor 114) from the first dataset. In some implementations, 702 is performed automatically (e.g., without requiring human input) in response to completing 701. At 703, a first set of distributions are generated based on the first plurality of representations. In some implementations, 703 is performed automatically (e.g., without requiring human input) in response to completing 702. At 704, a machine learning model (e.g., machine learning model 115) is trained based on the first plurality of representations and the first set of distributions. In some implementations, 704 is performed automatically (e.g., without requiring human input) in response to completing 703. At 705, a second data set is received from a second remote compute device (e.g., database 170 or compute device 160). The second dataset can be different from the first dataset. The first remote compute device can be a device different than the second remote compute device, or the same device as the second remote compute device. At 706, a second plurality of representations are extracted (e.g., using data preprocessor 114) from the second data set. In some implementations, 706 is performed automatically (e.g., without requiring human input) in response to completing 705. At 707, the machine learning model is executed based on the second plurality of representations, to produce a second set of distributions. In some implementations, 707 is performed automatically (e.g., without requiring human input) in response to completing 706. At 708, a score for each datum from the second data set is determined (e.g., using data drift detector 116) to produce a set of scores. The set of scores can be determined based on the first set of distributions and the second set of distributions. In some implementations, 708 is performed automatically (e.g., without requiring human input) in response to completing 707. At 709, a data drift is detected based on at least one score from the set of scores. In some implementations, drift of the data drift exceeds a predefined threshold, and the draft drift is detected because drift of the data drift exceeds the predefined threshold; if drift of the data drift did not exceed the predefined threshold, the data drift would not have been detected at 709. Alternatively, in some implementations, the draft drift has any amount of drift, and is detected without considering if drift exceeds the predefined threshold. At 710, a signal (e.g., electronic signal) is caused to transmit to cause at least one remedial action to be performed in response to detecting that the data drift exceeds a predefined threshold. In some implementations, 710 is performed automatically (e.g., without requiring human input) in response to completing 709. The signal to be transmitted to, for example, the data drift detection device 110, database 170, and/or compute device 160.

Figure 8:
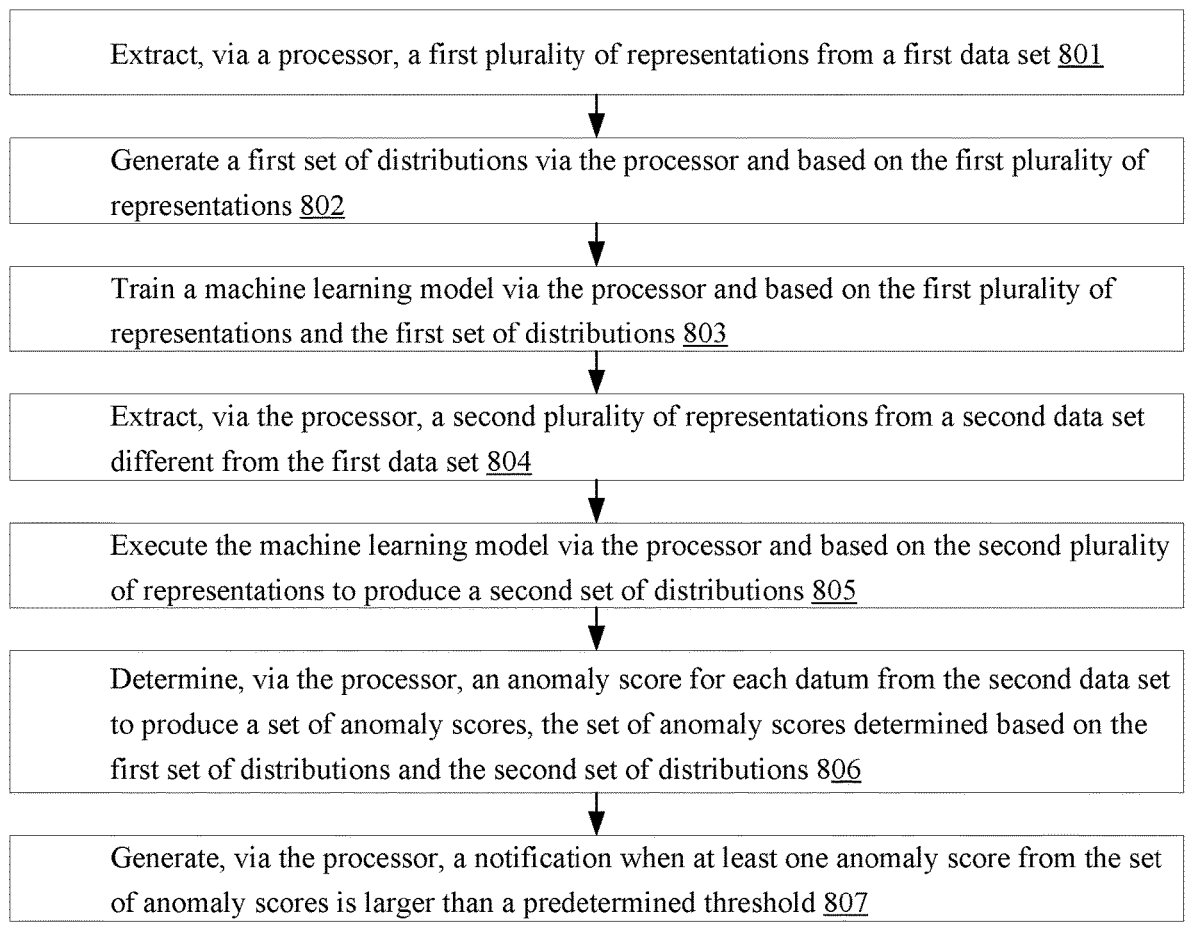
FIG. 8 shows a flowchart of a method for generating and using a set of anomaly scores, according to an embodiment.

FIG. 8 shows a flowchart of a method 800 for generating and using a set of anomaly scores, according to an embodiment. In some implementations, method 800 can be performed by processor 113 of the data drift detection device 110.

At 801, a first plurality of representations are extracted, via a processor (e.g., processor 113; using data preprocessor 114), from a first set data. At 802, a first set of distributions are generated, via the processor, based on the first plurality of representations. In some implementations, 802 is performed automatically (e.g., without requiring human input) in response to completing 801. At 803, a machine learning model (e.g., machine learning model 115) is trained, via the processor, based on the first plurality of representations and the first set of distributions. In some implementations, 803 is performed automatically (e.g., without requiring human input) in response to completing 802. At 804, a second plurality of representations are extracted, via the processor (e.g., using data preprocessor 114), from a second data set different from the first data set. At 805, the machine learning model is executed, via the processor, based on the second plurality of representations to produce a second set of distributions. In some implementations, 805 is performed automatically (e.g., without requiring human input) in response to completing 804. At 806, an anomaly score is determined, via the processor (e.g., using data drift detector 116), for each datum from the second data set to produce a set of anomaly scores. The set of anomaly scores are determined based on the first set of distributions and the second set of distributions. In some implementations, 806 is performed automatically (e.g., without requiring human input) in response to completing 805. At 807, a notification is generated, via the processor, when at least one anomaly score from the set of anomaly scores is larger than a predetermined threshold.

Figure 9:
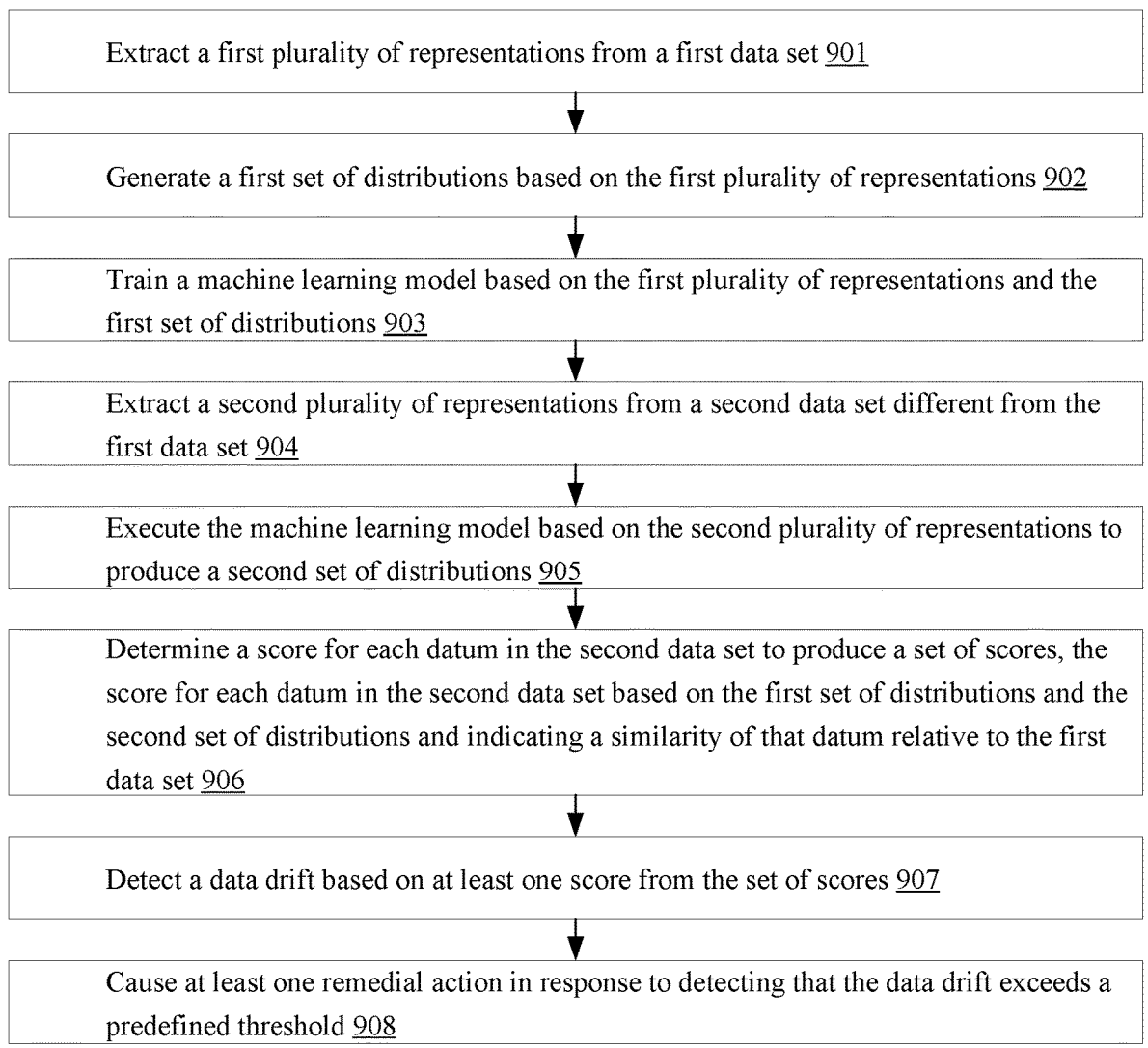
FIG. 9 shows a flowchart of a second method for detecting data drift, according to an embodiment.

FIG. 9 shows a flowchart of a method 900 for detecting data drift, according to an embodiment. In some implementations, method 900 can be performed by processor 113 of the data drift detection device 110.

At 901, a first plurality of representations are extracted (e.g., using data preprocessor 114) from a first data set. At 902, a first set of distributions are generated based on the first plurality of representations. In some implementations, 902 is performed automatically (e.g., without requiring human input) in response to completing 901. At 903, a machine learning model (e.g., machine learning model 115) is trained based on the first plurality of representations and the first set of distributions. In some implementations, 903 is performed automatically (e.g., without requiring human input) in response to completing 902. At 904, a second plurality of representations are extracted (e.g., using data preprocessor 114) from a second data set different from the first data set. At 905, the machine learning model is executed based on the second plurality of representations to produce a second set of distributions. In some implementations, 905 is performed automatically (e.g., without requiring human input) in response to completing 904. At 906, a score for each datum in the second data set is determined (e.g., using data drift detector 114) to produce a set of scores. The score for each datum in the second data set is determined based on the first set of distributions and the second set of distributions, and indicates a similarity of that datum relative to the first data set. In some implementations, 906 is performed automatically (e.g., without requiring human input) in response to completing 905. At 907, a data drift is detected based on at least one score from the set of scores. In some implementations, drift of the data drift exceeds a predefined threshold, and the draft drift is detected because drift of the data drift exceeds the predefined threshold; if drift of the data drift did not exceed the predefined threshold, the data drift would not have been detected at 907. Alternatively, in some implementations, the draft drift has any amount of drift, and is detected without considering if drift exceeds the predefined threshold. At 908, at least one remedial action is caused in response to detecting that the data drift exceeds a predefined threshold. In some implementations, 908 is performed automatically (e.g., without requiring human input) in response to completing 907.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features.

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

What is claimed is:

1. An apparatus, comprising:
   a memory; and
   a processor operatively coupled to the memory, the memory storing instructions to cause the processor to:
   receive a first data set from a first remote compute device, the first data set including a first set of unstructured text data;
   extract a first plurality of representations from the first data set using a neural network that extracts low dimensional representations of text-based data from the first set of unstructured text data;
   generate a first set of distributions based on the first plurality of representations;
   train a machine learning model based on the first plurality of representations and the first set of distributions, the machine learning model including a natural language processing model;
   receive a second data set from a second remote compute device, the second data set different from the first data set and including a second set of unstructured text data;
   extract a second plurality of representations from the second data set;
   execute the machine learning model based on the second plurality of representations, to produce a second set of distributions;
   determine a score for each datum from the second data set to produce a set of scores, the set of scores determined based on the first set of distributions and the second set of distributions, each score from the set of scores associated with a representation of text-based data from the second set of unstructured text data;
   detect a data drift based on at least one score from the set of scores; and cause transmission of a signal to cause at least one remedial action to be performed in response to detecting that the data drift exceeds a predefined threshold.

2. The apparatus of claim 1, wherein the at least one remedial action includes one of:
    causing transmission of a signal indicating the data drift to the second remote compute device; or
    retraining the machine learning model using the second data set.

3. A method, comprising:
    extracting, via a processor, a first plurality of representations from a first data set;
    generating a first set of distributions via the processor and based on the first plurality of representations;
    training a machine learning model via the processor and based on the first plurality of representations and the first set of distributions;
    extracting, via the processor, a second plurality of representations from a second data set different from the first data set, at least one of the first plurality of representations or the second plurality of representations including fixed-size numeric representations;
    executing the machine learning model via the processor and based on the second plurality of representations to produce a second set of distributions;
    determining, via the processor, an anomaly score for each datum from the second data set to produce a set of anomaly scores, the set of anomaly scores determined based on the first set of distributions and the second set of distributions; and
    generating, via the processor, a notification when at least one anomaly score from the set of anomaly scores is larger than a predetermined threshold.

4. The method of claim 3, wherein at least one of the first data set or the second data set includes at least one of imagery data, video data, audio data, natural language data, or tabular data.

5. The method of claim 3, wherein the machine learning model includes at least one of a residual network model, a variational autoencoder model, a normalizing flow model, or a generative adversarial network model.

6. The method of claim 3, wherein training the machine learning model includes:
    inputting, via the processor, a subset of representations from the first plurality of representations to the machine learning model to produce an estimated distribution;
    generating, via the processor, a loss value based on comparing the estimated distribution to a distribution from the first set of distributions; and
    adjusting, via the processor, at least one parameter of the machine learning model to minimize the loss value using at least one of an objective function or an optimization algorithm.

7. The method of claim 3, wherein the machine learning model is a computer vision machine learning model, the first data set includes a first set of imagery data, the second data set is a second set of imagery data, and each anomaly score from the set of anomaly scores is associated with a representation of an image associated with the second set of imagery data, the extracting the first plurality of representations including using a convolutional neural network to extract a low dimensional representation of each image from the first set of imagery data.

8. The method of claim 3, further comprising:
    retraining, via the processor, the machine learning model based on the set of anomaly scores and the second plurality of representations.

9. A non-transitory processor-readable medium storing code representing instructions to be executed by at least one processor, the instructions including instructions to cause the at least one processor to:
    extract a first plurality of representations from a first data set;
    generate a first set of distributions based on the first plurality of representations by identifying a count for each representation from the first plurality of representations;
    train a machine learning model based on the first plurality of representations and the first set of distributions;
    extract a second plurality of representations from a second data set different from the first data set;
    execute the machine learning model based on the second plurality of representations to produce a second set of distributions;
    determine a score for each datum in the second data set to produce a set of scores, the score for each datum in the second data set based on the first set of distributions and the second set of distributions and indicating a similarity of that datum relative to the first data set;
    detect a data drift based on at least one score from the set of scores; and
    cause at least one remedial action in response to detecting that the data drift exceeds a predefined threshold.

10. The non-transitory processor-readable medium of claim 9, wherein the at least one remedial action includes notifying a user of at least one of the at least one score, a trend associated with the set of scores, or a recommended action to remedy the data drift.

11. The non-transitory processor-readable medium of claim 9, wherein the at least one remedial action includes retraining the machine learning model to compensate for the data drift using the second data set.

12. The non-transitory processor-readable medium of claim 9, wherein the first data set includes unstructured data and multidimensional data.

13. The non-transitory processor-readable medium of claim 9, wherein the instructions further include instructions to cause the at least one processor to:
    receive training data from a remote compute device; and
    select the first data set from the training data, the first data set being a subset of the training data.

14. An apparatus, comprising:
    a memory; and
    a processor operatively coupled to the memory, the memory storing instructions to cause the processor to:
        receive, from a first remote compute device, a first data set that includes a first set of tabular data;
        extract a first plurality of representations from the first data set using a dimensionality reduction procedure;
        generate a first set of distributions based on the first plurality of representations;
        train a machine learning model based on the first plurality of representations and the first set of distributions, the machine learning model including a structured data machine learning model;
        receive, from a second remote compute device, a second data set that is different from the first data set and that includes a second set of tabular data;
        extract a second plurality of representations from the second data set;

execute the machine learning model based on the second plurality of representations, to produce a second set of distributions;

determine a score for each datum from the second data set to produce a set of scores based on the first set of distributions and the second set of distributions, each score from the set of scores associated with a representation of text-based data from the second set of unstructured text data;

detect a data drift based on at least one score from the set of scores; and cause transmission of a signal to cause at least one remedial action to be performed in response to detecting that the data drift exceeds a predefined threshold.

15. The apparatus of claim 14, wherein the at least one remedial action includes one of:

causing transmission of a signal indicating the data drift to the second remote compute device; or retraining the machine learning model using the second data set.

16. A method, comprising:

extracting, via a processor, a first plurality of representations from a first data set;

generating a first set of distributions via the processor and based on the first plurality of representations;

training a machine learning model via the processor and based on the first plurality of representations and the first set of distributions, the training the machine learning model including:

inputting, via the processor, a subset of representations from the first plurality of representations to the machine learning model to produce an estimated distribution, generating, via the processor, a loss value based on comparing the estimated distribution to a distribution from the first set of distributions, and adjusting, via the processor, at least one parameter of the machine learning model to minimize the loss value using at least one of an objective function or an optimization algorithm;

extracting, via the processor, a second plurality of representations from a second data set different from the first data set;

executing the machine learning model via the processor and based on the second plurality of representations to produce a second set of distributions;

determining, via the processor, an anomaly score for each datum from the second data set to produce a set of anomaly scores based on the first set of distributions and the second set of distributions; and generating, via the processor, a notification when at least one anomaly score from the set of anomaly scores is larger than a predetermined threshold.

17. The method of claim 16, wherein at least one of the first plurality of representations or the second plurality of representations includes fixed-size numeric representations.

18. The method of claim 16, wherein at least one of the first data set or the second data set includes at least one of imagery data, video data, audio data, natural language data, or tabular data.

19. The method of claim 16, wherein the machine learning model includes at least one of a residual network model, a variational autoencoder model, a normalizing flow model, or a generative adversarial network model.

20. The method of claim 16, wherein the machine learning model is a computer vision machine learning model, the first data set includes a first set of imagery data, the second data set is a second set of imagery data, and each anomaly score from the set of anomaly scores is associated with a representation of an image associated with the second set of imagery data, the extracting the first plurality of representations including using a convolutional neural network to extract a low dimensional representation of each image from the first set of imagery data.

21. The method of claim 16, further comprising:

retraining, via the processor, the machine learning model based on the set of anomaly scores and the second plurality of representations.

* * * * *